Nov. 28, 1961  L. I. KAPLAN  3,010,680
AIRFOIL WITH BOUNDARY LAYER CONTROL
Filed July 28, 1958  2 Sheets-Sheet 1
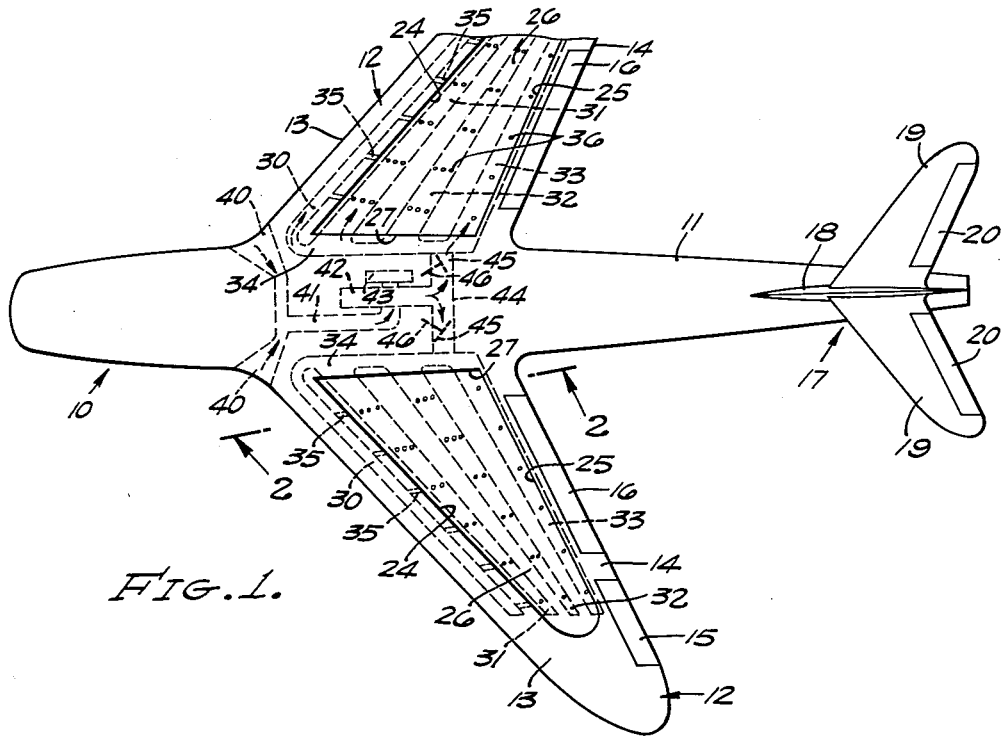
FIG. 1.
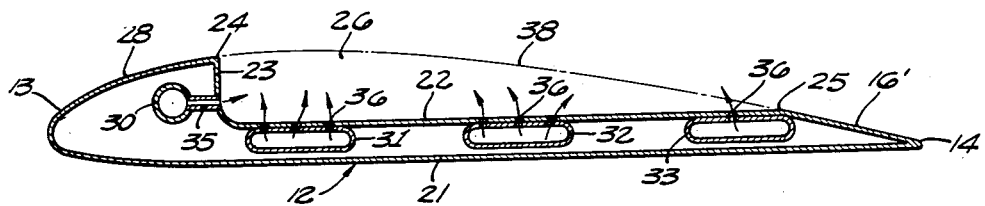
FIG. 2.
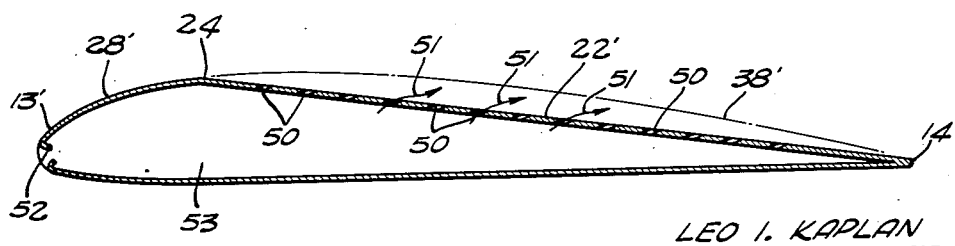
FIG. 3.
LEO I. KAPLAN
INVENTOR.
BY
ATTORNEYS

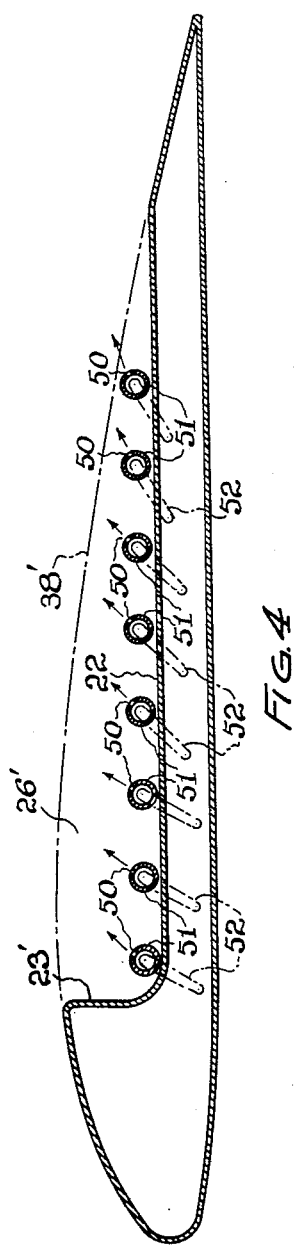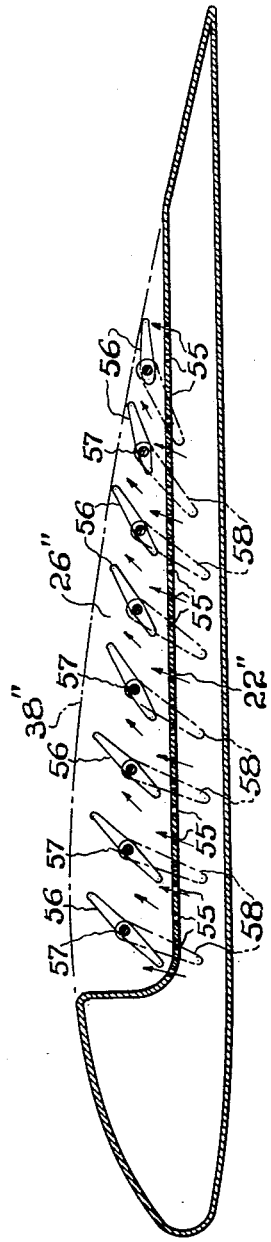

United States Patent Office 3,010,680
Patented Nov. 28, 1961

3,010,680
AIRFOIL WITH BOUNDARY LAYER CONTROL
Leo I. Kaplan, Sunland, Calif., assignor to Poly Industries, Inc., a corporation of California
Filed July 28, 1958, Ser. No. 753,172
14 Claims. (Cl. 244—42)

This invention relates to airfoils and more particularly to an airfoil design having improved operating characteristics at both low and high speeds. More particularly, the invention comprises an airfoil design providing greater lifting ability for a given size with reduced heat absorption.

The present application is a continuation-in-part of my application for United States Letters Patent Serial No. 646,347, filed March 15, 1957, for Airfoil, now abandoned.

It is well known that the lifting ability of a wing or other airfoil section of aircraft can be improved by energizing the boundary layer of air flowing over its low-pressure side to reduce turbulence and to prevent stalling. Methods for accomplishing these objectives have included jetting air outwardly through the airfoil surface into the adjacent boundary layer, conducting air from the boundary layer into the airfoil for disposal to the ambient atmosphere at another point, and a combination of these two methods in which air withdrawn at one point is injected back into the boundary layer at another point. While these various methods have shown promising results, each is subject to certain disadvantages circumvented by the present invention. For example, prior airfoil designs having provision for energizing the boundary air layer require additional interior reinforcing to counteract the weakening of the airfoil caused by the provision of the numerous air slots. Also, the air ducts supplying the slots present serious space, fabrication and servicing problems.

The present invention provides a simplified airfoil having a major portion of its low-pressure surface recessed to provide a pocket of energized air replenished continuously and controllably in such manner as to be effective in supporting and energizing the boundary layer passing over the depressed area of the airfoil in a curve conforming substantially to the normal airfoil surface and which structural surface is absent in the present design. Frictional contact of the air stream with a large part of the airfoil surface is eliminated while at the same time the lifting capability of the airfoil and its aerodynamic efficiency are increased. It will be recognized that the principles of the present invention have beneficial application not only to airfoil section as useful in aircraft but wherever there is relative movement between a fluid and some rigid structure. Accordingly, the term airfoil as used herein is to be considered generic to fan and turbine blades, propellor screws and to aerodynamic structures generally.

According to one manner of practicing the invention, finely divided streams of air may be distributed appropriately from a multiplicity of outlets formed in the depressed wall portions of the upper side of the airfoil. Certain advantages are to be enjoyed, however, if provision is made for adjusting the relative volume and direction of flow of the energizing air as found most beneficial under particular operating conditions to provide the most efficient and effective elastic fluid medium substitute for a rigid airfoil surface. This may be achieved in various ways as, for example, the use of adjustable air supply nozzles discharging as required to provide the substitute airfoil surface. Or according to another arrangement, adjustable vanes or baffles may be used in combination with air supply openings or nozzles to distribute the air in the relative proportions and directions found to produce the most effective results.

It is, accordingly, a principal object of the present invention to provide a new and improved airfoil.

Another object of the invention is the use of an elastic fluid medium in a manner to form an effective dynamic and substantially frictionless airfoil surface in lieu of the rigid, static and high friction surfaces heretofore employed.

Another object of the invention is the provision of an airfoil having a major portion of its low pressure surface area provided by a continuously replenished body of elastic fluid effective in supporting the slipstream thereopposite along a surface merging smoothly with the leading and trailing surface areas of an airfoil.

Another object of the invention is the provision of an airfoil having a plurality of individually adjustable means for supplying energizing fluid in a manner to provide a fluid airfoil surface.

Another object of the invention is to provide an airfoil utilizing air supplied to a large area depression in its low pressure side to support the boundary air layer in place of the usual adjacent airfoil surface with resultant elimination of the frictional drag effect presented by an airfoil surface.

Still another object of this invention is to provide an airfoil having a recessed surface area of substantial depth in its low-pressure side in combination with means for supplying air to the depression from within the airfoil in controlled volumes and velocities, and effective to prevent stalling and turbulence in the boundary layer air flowing thereover.

Yet another object of the invention is to provide an airfoil having a depression centrally of its low-pressure surface, the rim edges of which emerge with the leading and trailing edges of the airfoil surface inwardly therefrom and having air supply ports opening into the depression from the interior of the airfoil.

These and other more specific objects will appear upon reading the following specification and claims, and upon considering in connection therewith the attached drawing to which they relate.

Referring now to the drawing in which preferred embodiments of the invention are illustrated:

FIGURE 1 is a top plan view of an aircraft incorporating the features of the invention, one wing tip being broken away;

FIGURE 2 is a sectional view through a wing taken on line 2—2 of FIGURE 1;

FIGURE 3 is a view similar to FIGURE 2 but showing a modified embodiment of the invention;

FIGURE 4 is a transverse sectional view through an airfoil showing another embodiment of the invention; and FIGURE 5 is a transverse sectional view through an airfoil according to still another embodiment.

Referring again to the drawings, there is shown a typical high-speed aircraft designated generally 10 having an elongated main fuselage 11. Projecting laterally from the sides of the fuselage are a pair of swept-back wings 12, 12 having a leading edge 13 and a trailing edge 14. The trailing edge is provided in accordance with conventional practice with a plurality of control flaps 15 and 16 having their inner longitudinal edges suitably hinged to the wing and provided with control mechanism interiorly thereof for elevating and depressing the same as desired by the pilot. It will be understood that the rear end of fuselage 11 is provided with a suitable tail structure 17 including the usual upright central airfoil section 18 and a pair of laterally extending airfoil sections 19 each having a pivoted control flap 20.

Referring to FIGURE 2, it will be seen that each wing is of generally conventional airfoil shape as regards its leading edge 13, its trailing edge 14 and its lower or high-pressure surface 21. The entire central area of the upper or low-pressure surface of the wing is deformed toward lower surface 21 to provide an open-topped recess, chamber or depression 26 having a flat bottom wall 22 and a forward wall 23 substantially normal to wall 22. Wall 23 merges with the curved airfoil wall 28 the forward portion of which forms the upper surface of the leading edge of the wing. It will be understood that the forward rim 24 of depression 26 lies generally parallel to the leading edge of the airfoil and slightly forwardly of the maximum depth of the airfoil as determined by continuing the contoured surface 28 rearwardly toward trailing edge 14 along an aerodynamic path represented by dot-and-dash line 38 in FIGURE 2. The rearward portion of depression 26 merges with surface 16' at the trailing edge of the wing along a line 25 spaced forwardly of the inner or pivoted edge of flaps 15 and 16. Depressions 26 preferably terminate at the root end of wings 12 along lines 27 lying flush with the side walls of fuselage 11. Preferably, and as shown, each depression 26 covers a major portion of the upper surface of the wings.

The means for supplying boundary layer energizing air through walls 22 and 23 of the depression comprises air ducts 30, 31, 32 and 33 extending lengthwise of the wing and having a common supply manifold interconnecting their ends. These ducts have a large number of discharge passages opening through walls 22 and 23 and into depression 26, duct 30 having tubes 35 opening through wall 23 and ducts 31, 32 and 33 having a multiplicity of openings 36 extending through wall 22. Certain of openings 36 are normal to wall 22 while others are inclined thereto for the purpose of assuring uniform air distribution to all parts of the depression.

The means for supplying air in the required volume and pressure to the air distributing ducts comprises a pair of air intake scoops 40, 40 facing forwardly at the junction of fuselage 11 with wings 12. These scoops open into an air duct 41 leading to the inlet of a suitable blower or air compressor 42 driven by a motor 43. As shown, blower 42 discharges into an air main 44 having its opposite ends opening into manifolds 34, 34; but it will be recognized that the blower may be connected to the air main 44 by way of an air storage tank, if desired. Air main 44 is provided with a pair of suitable control valves 45, 45 having levers or the like 46, 46 for adjusting the valves as required to maintain the air pressure in each wing depression equal to the pressure within the overlying boundary layer. Depending upon the speed of the aircraft, the pressurization to be accomplished by the compressor 42 will vary. In supersonic planes it will not be necessary with the plane in flight.

The operation of the described improved airfoil construction provided by the present invention and of the means for energizing the contiguous portion of the boundary layer will be apparent from the foregoing description of the structure employed. When the aircraft is ready for flight, the pilot, in addition to the usual routine requisite steps essential for flight, closes a switch or takes other necessary steps to initiate operation of motor 43 driving air blower 42. The air flows inwardly through the large area scoops 40 and through duct 41 and into the inlet of blower 42. The compressed air issuing from the blower passes either into a storage chamber not shown for distribution of the distributing ducts or directly to the duct distributing system through the main supply duct 44. In either case the volume and pressure of the air discharging from the ends of air main 44 is controlled by valves 45 having individual operating levers 46. Air at an accurately controlled pressure flows through a manifold 34 into each of the ducts 30, 31, 32 and 33, and through passages 35 and 36 into the depression 26 in each wing. So long as the plane remains stationary there is insufficient air flow over the wings to limit the escape of air from the open upper sides of depressions 26. When the plane is airborne by power supplied in any suitable conventional mode, however, valves 45 can be adjusted to deliver air to the depressions in the proper volume and velocity to reduce and substantially eliminate turbulence within the boundary layer contiguous to depression 26 and lying generally along the aerodynamic surface indicated by dot-and-dash line 38. Under these operating conditions the boundary layer opposite depression 26 will be recognized as supported between the exteriorly lying slipstream air and the elastic fluid medium within depression 26. Since this layer lies in close contact with the rims 24, 25 and 27 of depression 26, a major portion of the energizing air within the depression 26 is held captive within the depression and only minor portions of the energizing air need replenishment. The relatively small portion which bleeds into the boundary layer or is entrained therewith is replenished by air from the passages 35 and 36. Under these conditions there is a minimum of frictional drag between the boundary layer and the supporting surface provided by the cushion of air held captive in depression 26. A certain part of the air in depression 26 will bleed into the boundary layer and be carried away. However, this small volume of air is replenished immediately by air supplied through passages 35, 36.

The airfoil disclosed is effective to provide smooth, aerodynamically efficient flow of air over the upper surface of the wing in the absence of any immediate underlying structure tending to shape the path of airflow. Since the boundary layer passing along line 38 does not contact a structural surface, there is substantially no friction loss and the air in all strata of the boundary layer flows at the same velocity. In consequence, the boundary layer air does not stall nor become turbulent to any objectionable degree as it does when passing in direct contact with an airfoil surface structure and the lifting capacity of the wing or other airfoil section is increased in a very substantial respect at both low and high plane velocities, it being understood that the energizing air requirements vary with the plane velocity. These variations in the volume of energizing air are easily controlled by means of regulating devices such as the manually-operated valves 45 or by suitable automatic valves responsive to pressure conditions in the slipstream air to maintain the air pressure in depression 26 equal to the pressure within the boundary layer.

In a second preferred embodiment of the invention illustrated in FIGURE 3, fluid obtained from a high-pressure area exteriorly of the airfoil is utilized to energize the boundary layer without need for power-driven circulating means for delivering the energizing fluid to the area of use. Another characteristic difference involves the use of a substantially planar energizing fluid distributing panel 22' having its forward edge merging with the upper surface 28' of the airfoil along line 24' and its trailing edge merging with the rear of the airfoil closely adjacent its trailing edge 14'. Panel 22' is provided with a multiplicity of small fluid distributing openings 50 discharging rearwardly at an acute angle and in the general direction of the slipstream flow as indicated by the arrows 51.

The elastic energizing fluid enters ducts 52 opening through the leading edge 13' of the airfoil and flows into a plenum chamber 53 underlying distributing panel 22' and formed in part by this panel, as is made clear by FIGURE 3. The inlet ends of ducts 52 being located in a high-pressure area of the airfoil as the latter is moving forwardly through the ambient fluid, a continuous and ample supply of pressurized elastic fluid to the plenum chamber is assured under normal operating conditions. It will be understood that under conditions normally prevailing the fluid supply is automatically responsive to variations in the relative air stream velocity and increases or decreases in accordance with conditions. Under abnormal conditions it may be desirable to employ flow control devices or power-driven flow-producing devices to supplement beneficially the automatic action of the described construction. It is believed that the small size of the energizing outlets 51 are effective in directing the fluid flow and that these openings cooperate with ducts 52 and the described disposition of their inlet ends.

It will be understood that the manner in which the elastic fluid discharging from openings 51 functions to energize beneficially the boundary layer passing over the low-pressure surface of the airfoil is generally similar to that described in detail above in connection with FIGURES 1 and 2. One difference is that the close proximity of distributing panel 22' to the path 38' of the boundary layer makes it desirable for the energizing fluid to discharge thereinto tangentially and substantially in the direction of the boundary layer flow as is indicated by arrows 51. When so supplied a small volume of energizing fluid has maximum effectiveness in inhibiting disruptive fluid flow tendencies in the boundary layer found to be so detrimental to efficient airfoil performance.

Referring to FIGURE 4, there is shown another preferred embodiment of the invention generally similar to the first described embodiment but differing essentially in that the pressurized elastic fluid medium used to energize the boundary layer is supplied to the chamber formed by depression 26' through a multiplicity of jets or nozzle openings 50. These jets are distributed along conduits 51 rotatably supported in any suitable manner adjacent bottom wall 22' of depression 26'. It is pointed out that the pressurized fluid is supplied to conduits 51 in any suitable manner as from the pressurized duct system 34, 45 described in connection with FIGURES 1 and 2. Each of conduits 51 is separately supported for rotation about its own longitudinal axis and can be adjusted to any selected position by suitable control levers 52, 52. This adjustment will be understood as permitting the energizing fluid issuing from nozzles 50 to be directed in the particular manner and direction found most beneficial and effective in energizing the boundary layer along aerodynamically-contoured surface indicated by dot-and-dash line 38' thereby minimizing stalling and turbulence in both the boundary layer and in slipstream air flowing over the upper surface of the airfoil. As will be observed from FIGURE 4, it is found that under one set of flight conditions frequently experienced highly satisfactory and improved flight conditions are achieved by positioning the different fluid supply nozzles of the various tubes 51 in the relative position illustrated in FIGURE 4. It will, of course, be appreciated that under different flight conditions different relative adjustments of the fluid supply nozzles may be found desirable.

Referring to FIGURE 5, still another preferred embodiment comprising a variant of the structure illustrated in FIGURE 4 is found to provide excellent results. Bottom wall 22'' of depression 26'' is there provided with a multiplicity of energizing fluid inlets 55, 55 understood as distributed throughout wall 22''. The fluid supply to the inner ends of these openings is from the same source described in connection with FIGURE 1 and may include suitable air distributing ducts. Alternatively, the entire interior portion of the airfoil may be utilized as a fluid distributing manifold. The most effective and suitable distribution of the pressurized air supplied through openings 55 is here effected by the use of a series of air-directing baffles individually supported at their opposite ends on pivots 57 and mounted generally parallel to one another entirely within depression 26''. Associated with each of these baffles are independently adjustable control levers 58 adapted to be adjusted either prior to flight or while the aircraft is in flight and as found necessary and desirable to provide the most effective lifting action under the particular flight conditions then prevailing.

As was true with respect to each of the previously described embodiments, it is pointed out that the baffles 56 are operative to direct and distribute the energizing fluid supplied to depression 26'' through ports 55 to support the boundary layer of the slipstream fluid along the aerodynamic surface 38'' to the end that the latter will merge smoothly with the edges of depression 26''.

While the particular boundary layer energizing devices herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. An airfoil structure having wide spaced-apart aerodynamic surfaces interconnected at their adjacent lateral edges to provide leading and trailing edges, one of said surfaces lying on the high-pressure side and one on the low-pressure side of said airfoil, the major portion of said low-pressure surface having a wide area depression therein spaced substantially below the general aerodynamic contour of said low pressure surface and having edges spaced laterally inward of the leading and trailing edges of said airfoil structure, fluid passages extending through the depressed portion of said low-pressure surface for the passage of fluid outwardly from said wide area depression within said airfoil structure in a quantity and at a velocity to prevent turbulence in the slipstream, whereby the fluid supplied to said depression provides a low-friction supporting medium for the boundary layer of air flowing across said depression between the forward and rear edges thereof and over the trailing edge of said airfoil structure.

2. An aerodynamic structure having an airfoil, said airfoil comprising wide spaced-apart aerodynamically-contoured surface forming means, said airfoil having leading and trailing edges joining the adjacent lateral edges of said surface forming means, one of said surfaces having a wide shallow depression therein having a continuous rim edge merging with the aerodynamic surface of said airfoil along lines spaced inwardly from adjacent the leading and trailing edges thereof, said depression having a large number of small widely distributed passages opening thereinto and lying appreciably inwardly of and out of contact with the slipstream passing over said structure for supplying a fluid medium to energize the boundary layer air flowing across the open side of said depression, said depression being unobstructed and free of structural elements adjacent the open side thereof whereby air supplied to said depression is effective to energize without obstruction the lower surface of the major portion of the boundary layer flowing thereacross.

3. An aerodynamic structure as defined in claim 2 including means for distributing a controlled volume of air at low pressure along the length of said airfoil for delivery through said passages into said depression.

4. An aerodynamic structure as defined in claim 2 having air inlet means for admitting outside air thereinto, means within said structure for compressing said air and for distributing the same along said airfoil and through said passages opening into said depression.

5. An aerodynamic structure as defined in claim 2 wherein said air passages opening into said depression have axes inclined to one another for delivering and distributing air to said depression in a manner to minimize turbulence in the slipstream flowing past said depression.

6. An aerodynamic structure as defined in claim 2 wherein said depression has a relatively wide wall and a relatively narrow wall disposed at an angle thereto, the free lateral edge of said wide wall merging with said airfoil near the trailing edge thereof and the free lateral edge of said narrow wall merging with said air foil near the leading edge thereof.

7. An aerodynamic structure as defined in claim 6 wherein certain of said air supply passages open through said narrow wall and certain others thereof open through said wide wall of said depression.

8. An aerodynamic structure as defined in claim 6 including a plurality of air distributing ducts extending lengthwise of said depression, at least one of said ducts being adjacent the narrow wall portion of said depression and having air distributing means opening through said narrow wall into said depression, and other of said ducts being adjacent the wide portion of said depression wall and having openings through the wide wall portion of said depression for discharging air across the path of air issuing from said first-mentioned openings.

9. In combination, an aircraft having an elongated main body provided with aerodynamically-shaped hollow wings projecting from the opposite lateral sides thereof, said wings having a wide depression of substantial depth and volume extending over a major portion of the upper low-pressure side thereof, said depression being free of structural elements opposite the exterior surface thereof and the bottom thereof being out of contact with the slipstream passing over said wings, and means for supplying a pressurized medium to said depression through a multiplicity of small openings discharging in a direction inclined to the surface of said depression while said aircraft is in flight in sufficient volume and velocity to minimize turbulence in the slipstream air flowing across the open top of said depression, said air within said depression being effective to energize said boundary layer and to cause the same to flow in an aerodynamically-contoured path coincident with the aerodynamic path of air flow over the wing.

10. An airfoil having a leading edge and a trailing edge interconnected by wide aerodynamically-contoured upper and lower surfaces, said upper surface having a wide depression covering the greater portion thereof and having a bottom surface spaced substantially below the upper surface generally of said airfoil and out of contact with the slipstream passing over said airfoil, the bottom wall of said depression merging gradually with said airfoil adjacent the trailing edge thereof and merging relatively abruptly therewith along a line spaced rearwardly from the leading edge of the airfoil, a multiplicity of air passages opening through the bottom wall of said depression, means within said airfoil for conducting air to said passages, said passages being effective to distribute air throughout said depression in a quantity and at a velocity adequate to minimize objectionable drag effects resulting from turbulence and friction of the boundary layer air flowing over the upper side of said airfoil.

11. An airfoil structure having elongated upper and lower surfaces connected to provide a leading edge and a trailing edge along the opposite lengthwise edges thereof, said upper surface having a wide depression therein extending from a line substantially parallel to said leading edge and spaced adjacent the area of maximum airfoil depth rearwardly to a line adjacent said trailing edge, air supply duct means within said airfoil having a multiplicity of outlets extending through the wall of said depression to supply air thereinto, certain of said passages being positioned to direct air rearwardly toward the trailing edge of said airfoil and certain others being positioned to direct air in a direction crossing the path of the air from said first-mentioned passages.

12. A hollow aerodynamic structure having a leading edge and a trailing edge interconnected by spaced-apart aerodynamically contoured surfaces, one of said surfaces opposite an area of said structure subject to reduced pressure under operating conditions of the structure being depressed substantially below and out of contact with the slipstream, said depressed surface being provided with a multiplicity of fluid-distributing passages therethrough dispersed generally over the surface area of said depressed surface and positioned to discharge energizing fluid in the general direction of the depth of said depressed surface and toward the trailing edge of said structure and fluid passage means for supplying energizing fluid to the interior ends of said passages from a high-pressure area exteriorly of said structure and adjacent the leading edge thereof.

13. A hollow aerodynamic structure as defined in claim 12 wherein the flow of energizing fluid is assisted by the pressure differential naturally existing between a high-pressure zone adjacent one surface area of said structure and a low-pressure area existing opposite the outer ends of said fluid distributing passages.

14. A hollow aerodynamic structure as defined in claim 12 wherein at least one half the width of the low-pressure area of said structure is provided with the distributing passages for discharging an energizing fluid medium into the boundary layer of the slipstream flowing over said structure.

References Cited in the file of this patent

UNITED STATES PATENTS

| | | |
|---|---|---|
| 1,775,757 | Gay | Sept. 16, 1930 |
| 1,918,897 | Colburn | July 18, 1933 |
| 1,919,142 | Wetzel | July 18, 1933 |
| 2,267,927 | Kightlinger | Dec. 30, 1941 |
| 2,430,431 | Lanier | Nov. 4, 1947 |

FOREIGN PATENTS

| | | |
|---|---|---|
| 29,364 | Great Britain | of 1911 |
| 596,884 | France | Aug. 17, 1925 |